Sept. 23, 1930.　　J. GOULDBOURN ET AL　　1,776,430
METHOD OF MAKING SHOES
Filed April 22, 1925　　4 Sheets-Sheet 1

INVENTORS:
Joseph Gouldbourn
Fred Ricks
By their Attorney,
Nelson W. Howard

Sept. 23, 1930.    J. GOULDBOURN ET AL    1,776,430
METHOD OF MAKING SHOES
Filed April 22, 1925    4 Sheets-Sheet 2

Sept. 23, 1930.   J. GOULDBOURN ET AL   1,776,430
METHOD OF MAKING SHOES
Filed April 22, 1925   4 Sheets-Sheet 4

Patented Sept. 23, 1930

1,776,430

UNITED STATES PATENT OFFICE

JOSEPH GOULDBOURN AND FRED RICKS, OF LEICESTER, ENGLAND, ASSIGNORS TO UNITED SHOE MACHINERY CORPORATION, OF PATERSON, NEW JERSEY, A CORPORATION OF NEW JERSEY

METHOD OF MAKING SHOES

Application filed April 22, 1925, Serial No. 25,127, and in Great Britain May 19, 1924.

This invention relates to the manufacture of boots and shoes, hereinafter referred to for convenience as "shoes," and has for an object the production of shoes of a uniform standard of excellence with substantial economies as compared with the usual methods of shoe manufacture. It is a more particular object of the invention to eliminate the need for much of the skill and care required heretofore, especially in pulling-over and lasting operations, with a consequent saving in labor cost, while at the same time insuring a uniformly high class product. The invention also aims to disturb as little as possible, consistently with the objects in view, present shoe factory methods and equipment.

To the above and other ends, the invention provides a novel method of making shoes whereby the shaping of the upper materials is effected without the need for any high degree of skill or judgment on the part of the workman. In accordance with the practice herein illustrated, the upper is molded at the toe and heel ends substantially to the shape desired for the finished shoe and is fastened permanently to the insole at both ends before the shoe is mounted on a last, the upper being somewhat stretched lengthwise in the heel end molding operation, and thereafter a last is inserted and the upper is further stretched lengthwise by engagement of the last with its molded ends prior to the side lasting of the shoe. By thus molding the ends of the upper the need for a high degree of skill on the part of the workman in the shaping of these portions of the shoe is dispensed with; and the ends having been molded and fastened to the insole, all that is needed to complete the lengthwise stretching of the upper to the required degree is to mount the shoe on the last. The fastening of the upper permanently to the insole at the toe end as well as at the heel end before the last is inserted facilitates the use of the last to tension the upper without danger of relative displacement of the upper and the insole. It is preferred to fasten the molded ends of the upper to the insole substantially as far along the sides of the shoe as the molding extends, i. e., at the toe substantially as far as the tip line on shoes that are provided with tips.

It is contemplated that after the shoe has been mounted on the last the sides of the shoe or portions thereof may be lasted progressively as heretofore by the use, for example, of a lasting machine of the hand-method type, although the invention is not limited to this manner of lasting the sides. It is found, however, that on some work better results are secured by subjecting the forepart of the upper at the rear of the molded toe to an operation in the nature of a pulling-over operation prior to the side lasting of the shoe at the rear of the forepart, and in one aspect the invention therefore includes the step of pulling the upper over the last in this location, preferably at the opposite sides simultaneously, and fastening it before lasting the shoe in the shank. This serves to conform the upper tightly to the contour of the last at the top of the forepart between the tip line and the instep, where there might otherwise be danger, on some work, that the upper by reason of its lengthwise tension would bridge the hollow of the last.

In carrying out the method of this invention there is preferably utilized a type of last which comprises portions that are relatively movable to increase the effective length of the last in the shoe, such for example as an ordinary hinged last, this type of last being hereinafter referred to generically as an "expansible" last. As herein exemplified, the last is inserted in the shoe before the upper is laced, and in one aspect of the invention it is contemplated that the stretching of the upper incidental to the introduction of the last will be accomplished partly at least by expanding the last (i. e. straightening it if it is a hinged last) before the upper is laced. Thereafter the last is preferably contracted to permit the lacing to be readily inserted, and then expanded again to stretch the upper further. In this manner the required stretching of the upper by the use of the last is easily effected in successive stages.

The invention is herein illustrated in its application to the manufacture of shoes of the McKay-sewed type in which the molded toe is provided with an inturned flange formed to lie throughout its width upon the bottom face of the insole and fastened by tacks to the insole before the last is inserted. It will, however, be recognized that in various novel and useful aspects the invention is not limited to the manufacture of shoes of this particular type.

The invention will now be more particularly explained by reference to the accompanying drawings, which illustrate various steps performed in accordance with one mode of procedure in carrying out the method, and will thereafter be pointed out in the claims.

Figure 1:
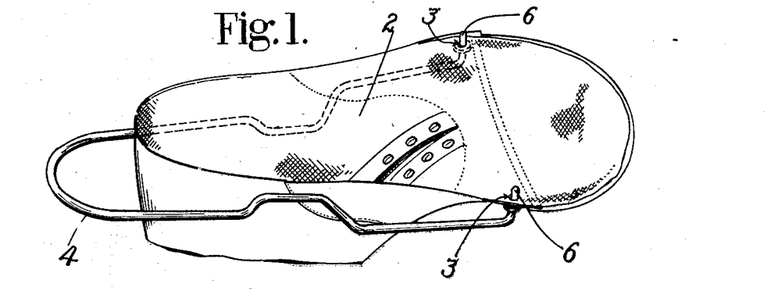
Fig. 1 is a view showing assembled upper materials mounted on a presenter which engages the upper in jig holes formed therein for presenting the upper in exact predetermined relation to means for molding the toe.
Figure 2:
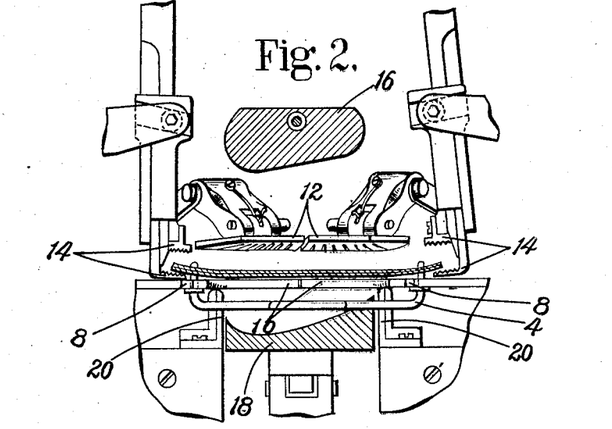
Fig. 2 is a view illustrating how the upper is presented to mechanism which may be utilized for molding the toe.
Figure 3:
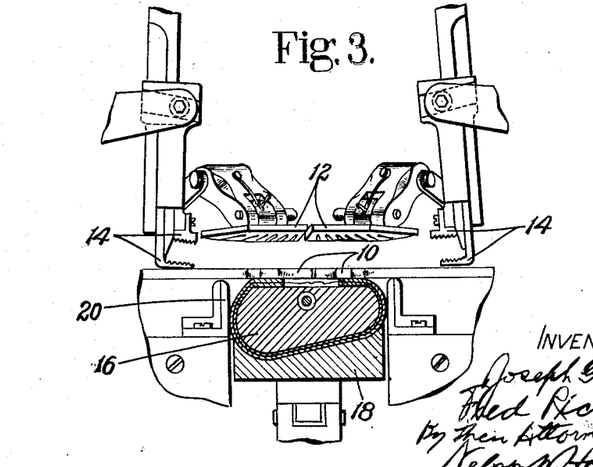
Fig. 3 is a view of some of the parts shown in Fig. 2 as positioned at the end of the toe-molding operation.

As shown in Fig. 1, the upper 2, provided with jig holes 3 in its margin at the opposite sides of the forepart, and including a toe tip and box toe stiffening material, is mounted on a presenter 4 provided with upturned ends or pins 6 which engage the upper in the jig holes. By the use of the presenter the upper is positioned, as illustrated in Fig. 2, in exact predetermined relation to mechanism for molding the toe substantially to the shape desired for the finished shoe, the pins 6 entering slots 8 formed in wipers 10 to determine the position of the upper lengthwise, laterally and angularly. In addition to the wipers, the toe-molding means comprises clamp members 12 which clamp the margin of the upper outspread upon the wipers, grippers 14 which grip the upper at the opposite ends of the tip seam, an inner form or mold 16, an outer form or toe rest 18 complementary in shape to the form 16, and an upwiping band 20 which embraces the toe about the form 16. In the toe-molding operation the margin of the upper is clamped on the wipers by the members 12, the grippers 14 close upon the margin of the upper at the opposite ends of the tip seam, and the presenter 4 is then withdrawn from the jig holes in the upper. The form 16 by downward movement engages the toe of the upper while the latter is controlled by the clamp members 12 and the grippers 14 and presses its intermediate portion down on the outer form 18, and thereafter both the members 16 and 18 are moved downwardly together while the upper is wiped up about the form 16 by the action of the band 20, the margin of the upper slipping as required between the clamp members 12 and the wipers, and the grippers 14 swinging toward each other in response to the pull of the upper while maintaining a firm hold on the upper at the ends of the tip seam. Thereafter the wipers 10 are moved inwardly to wipe the margin of the upper over the bottom face of the form 16 and thus to mold an inturned flange thereon as shown in Fig. 3, the clamp members 12 and the grippers 14 releasing the upper at a predetermined time with respect to the operation of the wipers. The mechanism herein shown for thus molding the toe, except as the parts are herein modified for McKay shoe work, is more fully shown and described and is claimed in Letters Patent Nos. 1,692,284 and 1,706,474, granted respectively on November 20, 1928 and March 6, 1929 upon applications of William C. Baxter.

It will be observed that the jig holes 3 in the margin of the forepart of the upper, whereby the upper is mounted on the jig pins 6, are located in the vamp at the rear of the tip line. It is thus contemplated that the invention may be utilized in a system of shoemaking which does not include the jigging of the tip in relation to the vamp and in which the tip, while located with sufficient accuracy lengthwise and angularly on the vamp, may through negligence be somewhat offset laterally. By the use of jig holes formed in the vamp at the rear of the tip line and bearing, therefore, an accurately predetermined relation to the throat of the vamp, the molded toe will be properly located relatively to the throat of the vamp notwithstanding any error that there may be in the positioning of the tip laterally of the vamp. It is also contemplated that in the manufacture of different sizes and styles of shoes the jig holes will be located at the same distance from the extremities of the toes and, therefore, sometimes at different distances from the tip lines in the different respective sizes or styles. An advantage, among others, in this mode of procedure is that it provides for positioning uppers of different sizes or styles in proper relation to the toe-molding means where it is desired, as it may be in McKay shoe work, to use the same wipers for two or more sizes or styles in combination with different molds or forms corresponding to the respective sizes or styles. Under those conditions it is desirable that the different forms be so mounted that their front end faces will bear the same relation to the edges of the wipers and will, therefore, be located at the same distance from the slots 8 in the wipers which determine the positions of the jig pins 6; and by locating the jig holes in the different uppers at the same distance from the extremities of the toes the latter are positioned, as they should be, in the same relation to the end faces of the different forms. Where the distance between the tip line and the extremity of the toe varies in different sizes or styles, the distance between the jig holes and the tip line will correspondingly vary. The jig holes may be formed in the vamp after the tip has been stitched to the vamp, or they may be formed in the vamp dieing-out operation by providing the vamp dies with suitable punches.

Figures 4, 5:
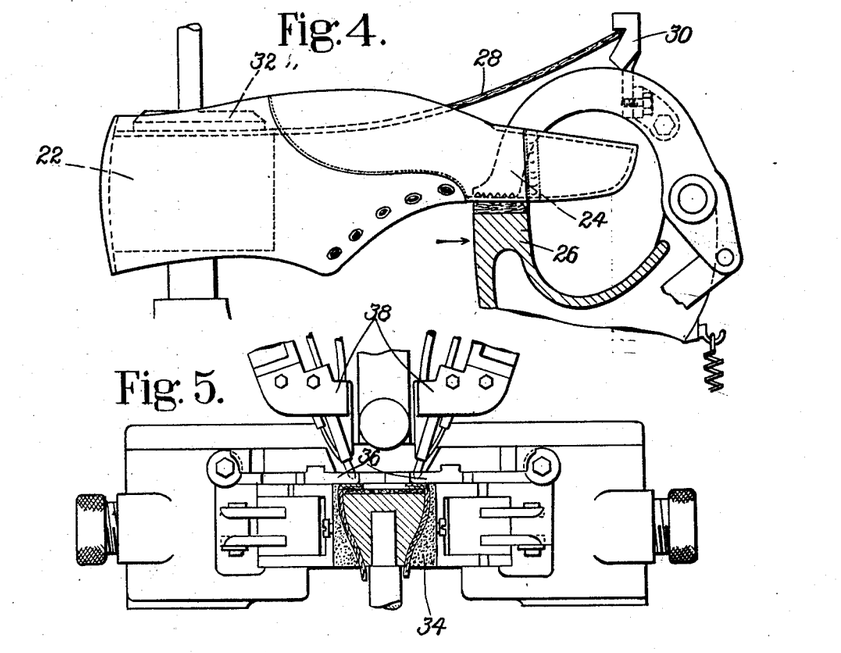
Fig. 4 illustrates how the upper with its toe end molded is assembled with an insole and is tensioned forwardly about a heel end form preparatory to the molding of the heel end of the upper.
Fig. 5 is a view showing heel end molding mechanism and illustrating how the upper positioned as shown in Fig. 4 is molded and secured to the insole at its heel end.

After the upper has been molded at its toe end, its heel end is molded and is fastened permanently to an insole by the use, for example, of a machine of the same general type as that described and claimed in Letters Patent No. 1,700,970, granted on February 5, 1929 upon an application of William C. Baxter, with modifications further described and claimed in Letters Patent No. 1,710,161, granted upon our application on April 23, 1929. Portions of the machine sufficient to illustrate the operations performed are shown in Figs. 4 and 5. The upper is mounted upon a heel end form 22 and is tensioned forwardly about the form to hold it in proper position and to stretch it somewhat lengthwise by means of a gripper comprising jaws 24 and 26 which grip the upper at the rear of its molded toe portion in a location in front of the lacing slit and pull it without impairing the molded shape. Before operating the gripper to tension the upper forwardly, the operator adjusts the upper about the form so that its back seam is in the proper position and so that its margin extends the proper distance above the bottom face of the form. Thereafter an insole 28 is positioned with its heel end upon the form 22 and is pressed back against the margin of the upper, the gripper jaw 24 having thereon a notched finger 30 which serves as a gage in positioning the forepart of the insole laterally and acts by bending of the insole to hold it pressed back against the upper. A clamp member 32 is then applied to the heel end of the insole, and the form with the upper, the gripper, and the insole positioning means are moved rearwardly into operative relation to the molding instrumentalities which comprise a heel clamping and shaping band 34 and wipers 36. In the molding operation the band 34 closes about the form 22, and the wipers 36 are operated to wipe the margin of the upper materials inwardly over the insole. Thereafter the clamp member 32 is withdrawn from clamping position, and tacking mechanism 38 is moved into position over the form and is operated to drive a plurality of heel seat tacks 40 (Fig. 6) to fasten the heel end of the upper to the insole substantially as far forwardly as the molding extends.

Figure 6:
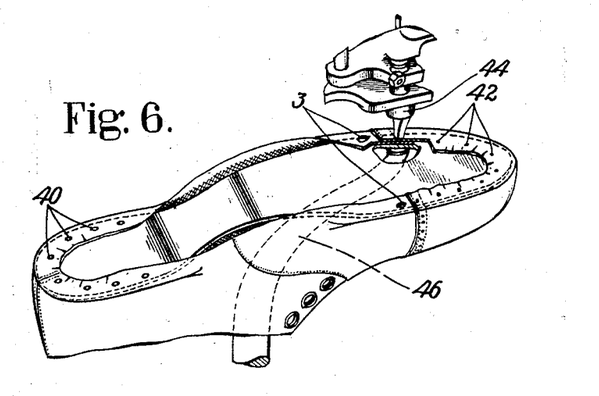
Fig. 6 illustrates how the molded toe end of the upper may next be fastened to the insole.

The toe end of the insole is next tucked inwardly under the inturned flange of the molded toe end of the upper, and this flange is fastened permanently to the insole by driving a plurality of tacks 42. This tacking operation may be effected by the use of any suitable machine or mechanism, for example a tacking machine of the Boston type provided with a tack nozzle 44 and a suitable horn 46 formed to extend within the shoe and to clinch the tacks. The tacks are preferably driven substantially as far rearwardly along the sides of the toe as the tip line, or as far rearwardly as the toe molding is effective in permanently shaping the upper materials. It will be observed that at this stage in the operations the intermediate portion of the insole is somewhat curved or bowed, thus allowing for subsequent lengthwise stretching of the upper.

Figure 7:
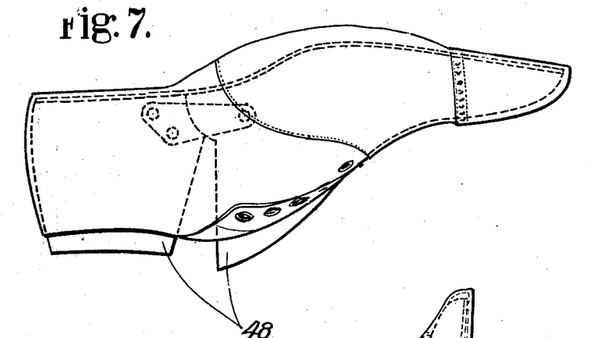
Fig. 7 shows the shoe with its molded toe and heel ends fastened to the insole and with a hinged last inserted and straightened in the shoe before the upper is laced.
Figure 8:
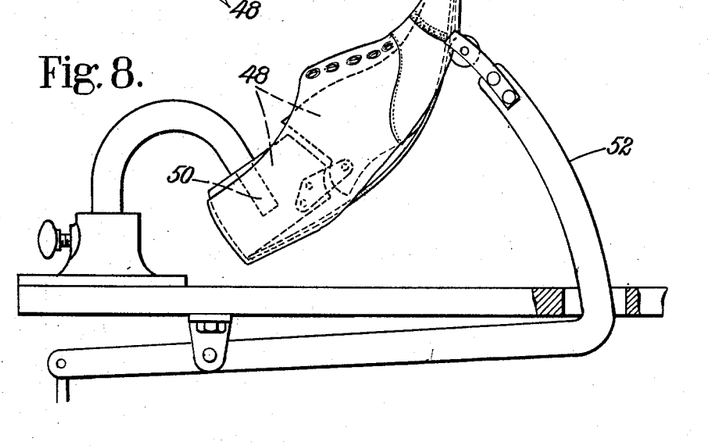
Fig. 8 illustrates how the last may next be contracted or "broken" by the use of apparatus convenient for the purpose to permit the lacing of the upper.
Figure 9:
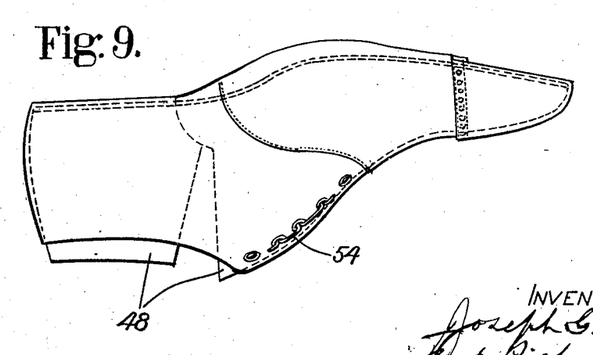
Fig. 9 shows the shoe with its upper laced and the last again straightened.

The next operation is to subject the upper to lengthwise tension and to position the molded toe and heel ends at the proper distance apart, and as herein illustrated this is done by inserting in the shoe a hinged last 48, of a type such as commonly used in shoe manufacture, and straightening the last. To do this conveniently, the last may be mounted upon a spindle and the upper pulled into place on the forepart of the last and over the heel end portion while the last is in a "broken" or contracted condition. This insertion of the last in the shoe may best be effected with the upper in an unlaced condition, and preferably the last is also straightened to stretch the upper to some extent while it is still unlaced, as illustrated in Fig. 7. To permit the upper then to be laced readily and effectively, it is preferable to "break" the last and thus relax the tension of the upper, and this may conveniently be done by the use of a device such as shown in Fig. 8, comprising a spindle 50 upon which the heel end of the last is mounted with the forepart of the upper facing upwardly and forwardly toward the operator, and a treadle-operated arm 52 which engages the bottom of the fore part of the shoe and by pressure thereon serves to break the last, as will be readily understood. The operator then laces the upper by the use, for example, of a wire lacer 54 of a well-known type. He then releases the treadle-operated arm 52 and straightens the last again by pressure applied to its forepart before removing it from the spindle 50. In this second straightening of the last the upper is further stretched due to the fact that it has been laced. By thus stretching the upper in successive stages through straightening of the last before and after lacing respectively the work is performed more easily and with better results on the shoe than if the stretching were effected all at one operation by straightening the last after the lacing of the upper.

Figures 10, 11:
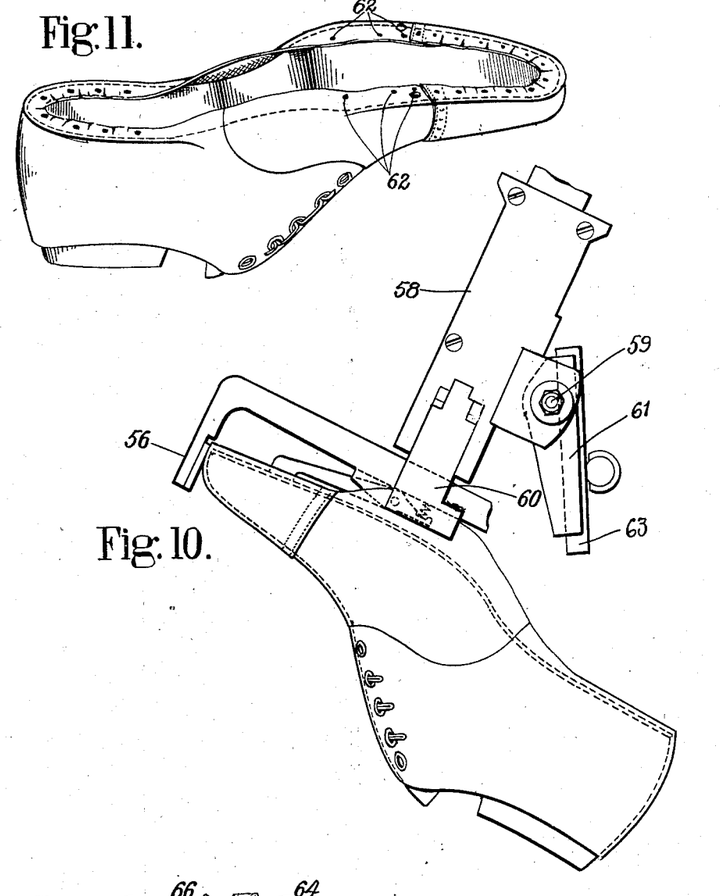
Fig. 10 illustrates how the shoe may be next subjected to a pulling-over operation at the rear of the molded toe.
Fig. 11 shows the shoe as it appears after it has been pulled-over in the manner illustrated in Fig. 10 and fastened to the insole in the location where the pull is applied.

The shoe is now ready for the side lasting operation which, in accordance with the practice herein illustrated, is divided into two stages. The shoe is first subjected to an operation which is somewhat in the nature of a pulling-over operation, whereby that portion of the margin of the upper which is located substantially between the molded toe portion and the ball line is gripped and pulled at the opposite sides of the shoe simultaneously and is then fastened to the insole in these locations. In this manner the upper is stretched laterally and is tightly conformed to the contour of the last between the tip line and the throat of the vamp, particularly over the top of the forepart at the rear of the toe where there might be danger otherwise that the upper would bridge the hollow of the last between the toe and the instep by reason of the lengthwise tension previously applied thereto. By pulling simultaneously at the opposite sides danger is avoided of distorting the upper or of displacing it on the last by such a hard pull as may be needed to conform it to the contour of the last at the top of the forepart. For subjecting the shoe to this treatment there may be utilized a pulling-over machine of a well-known type such as illustrated in Letters Patent No. 1,029,387, granted on June 11, 1912 upon an application of R. F. McFeely, so modified as to dispense with the toe gripper and tacker and to provide in place thereof a toe end abutment 56 (Fig. 10), and provided also with opposite side grippers 58 (only one of which is shown in Fig. 10) each having a single pair of jaws 60 for gripping and pulling the upper in the required locations. It may be desirable under some conditions that one at least of the grippers have a component of movement lengthwise of the shoe in its updraw movement, and for this purpose there is adjustably secured by means of a pivot pin 59 to each of the grippers a grooved member 61 which is slidably connected to a guide member 63 adjustable with the member 61 about the pivot pin 59. It will be understood that in the updraw movement of the gripper the member 61 slides along the member 63, and by suitable adjustment of the parts about the pivot pin 59 the gripper may thus be made to receive, in response to its updraw movement, a component of movement forwardly toward the toe or rearwardly toward the heel, or may be operated without any such component of movement lengthwise of the shoe. It has been found that under some conditions the best results are secured by an adjustment whereby the gripper at the inner side of the shoe is moved forwardly toward the toe in the upper-pulling operation while the gripper at the other side of the shoe receives no movement lengthwise of the shoe. After the upper has been pulled at the opposite sides simultaneously, as illustrated, and has been wiped inwardly over the insole, tacks 62 (Fig. 11) are driven by tacking mechanism with which machines of this type are provided to fasten the upper to the insole. As herein illustrated, the upper is thus fastened by three tacks at each side, the foremost tack being driven at or near the tip line and the rearmost tack but little, if any, in front of the ball line of the shoe. It will be understood that these tacks are fully driven and are clinched upon the anvil plate of the last.

Figure 12:
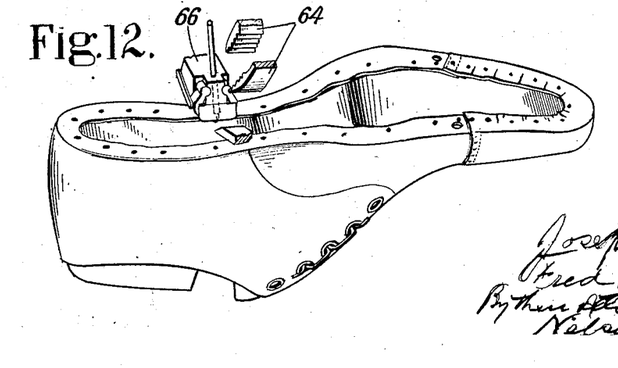
Fig. 12 illustrates the subsequent side lasting of the shoe along the shank.

The side lasting is now completed by the use, for example, of a lasting machine of the well-known hand method type, comprising upper gripping and pulling mechanism 64 and overwiping and tacking mechanism 66 (Fig. 12). Thereafter the shoe is completed in the usual manner characteristic of McKay shoe work.

It is to be understood that, in various novel and useful aspects, the invention is not limited to the use of apparatus or machinery of the particular character herein illustrated as convenient for carrying out the various steps of the method nor, except as required by the claims, to method steps carried out in the particular order in which they are described or of the particular character illustrated.

Having described the invention and set forth fully how the method may be practised, what we claim as new and desire to secure by Letters Patent of the United States is:—

1. That improvement in methods of making shoes which consists in molding the toe and heel ends of an upper off the last substantially to the shape desired for the finished shoe and to form at each end a flange for use in fastening the upper to an insole, stretching the upper lengthwise between its toe and heel ends while molding its heel end, fastening each of the molded end portions of the upper permanently to an insole by a row of fastenings spaced at short intervals all around the end of the upper substantially throughout the length of the molded flange, thereafter inserting in the shoe an expansible last and further stretching the upper lengthwise by relative movement of parts of the last, and after thus stretching the upper lasting the sides of the shoe between the molded toe and heel end portions.

2. That improvement in methods of making shoes which consists in molding the toe end of an upper off the last substantially to the shape desired for the finished shoe, molding the heel end of the upper off the last while subjecting the upper to lengthwise tension between its toe and heel end portions, and fastening the upper at the heel end to an insole, then fastening the molded toe end of the upper to the insole by permanent fastenings applied around the toe substantially as far rearwardly as the tip line, thereafter inserting a last in the shoe and stretching the upper lengthwise by engagement of the last with the molded toe and heel ends of the upper, and after said stretching of the upper lasting the sides of the shoe between the molded toe and heel end portions.

3. That improvement in methods of making shoes of the McKay-sewed type which consists in molding the toe and heel ends of an upper off the last substantially to the shape desired for the finished shoe with inturned flanges formed to lie over the margin of an insole, fastening said inturned flanges at the molded toe and heel ends of the upper permanently to an insole by rows of fastenings extending around the ends and along the sides of the shoe substantially as far as the molded portions extend and clinched inside of the shoe, thereafter stretching the upper lengthwise by relative movement of parts of an expansible last in engagement with the molded toe and heel ends of the upper, and after said stretching of the upper lasting the sides of the shoe.

4. That improvement in methods of making shoes which consists in molding the toe end of an upper off the last substantially to the shape desired for the finished shoe, molding the heel end of the upper while subjecting the upper to lengthwise tension between its toe and heel end portions and fastening the heel end of the upper to an insole, fastening the molded toe end of the upper to the insole by permanent fastenings inserted around the end and along the sides of the toe substantially as far rearwardly as the molded portion extends, thereafter stretching the upper lengthwise by relative movement of parts of an expansible last, and after thus stretching the upper lasting the sides of the shoe between the toe and heel end portions.

5. That improvement in methods of making shoes which consists in molding the toe end of an upper off the last substantially to the shape desired for the finished shoe, molding the heel end of the upper off the last while subjecting the upper to lengthwise tension by a pull applied in a location farther forward than the lacing slit, thereafter subjecting the upper to further lengthwise tension by relative movement of parts of an expansible last, and after thus tensioning the upper lasting the sides of the shoe between the toe and heel end portions.

6. That improvement in methods of making shoes which consists in molding the toe end of an upper off the last substantially to the shape desired for the finished shoe, subjecting the upper to lengthwise tension by engaging it at the heel end and at the forepart in a location farther forward than the lacing slit before a last is inserted, thereafter subjecting the upper to further lengthwise tension by relative movement of parts of an expansible last, and after thus tensioning the upper lasting the sides of the shoe.

7. That improvement in methods of making shoes which consists in stretching an upper lengthwise and also molding the toe end of the upper off the last substantially to the shape desired for the finished shoe and to form a flange for use in fastening the upper to an insole, fastening the molded toe portion of the upper permanently to an insole by a row of fastenings spaced at short intervals all around the toe substantially throughout the length of the molded flange, thereafter inserting in the shoe an expansible last and further stretching the upper lengthwise by relative movement of parts of the last, and after thus stretching the upper lasting the sides of the shoe.

8. That improvement in methods of making shoes of the McKay-sewed type which consists in molding the toe of an upper off the last substantially to the shape desired for the finished shoe with an inturned flange formed to lie over the margin of an insole and before the last is inserted driving a row of tacks about the toe substantially as far rearwardly as the tip line to fasten said flange permanently to an insole and clinching the tacks inside of the shoe, thereafter inserting a last in the shoe and stretching the upper lengthwise by engagement of the last with the opposite ends of the upper, and after thus stretching the upper lasting the sides of the shoe.

9. That improvement in methods of making shoes which consists in molding the toe and heel ends of an upper off the last substantially to the shape desired for the finished shoe, mounting the upper on a last and stretching it lengthwise by engagement of the last with its molded toe and heel ends, pulling the upper over the forepart of the last at the rear of the molded toe at the opposite sides of the last simultaneously and fastening it, and thereafter lasting the sides of the shoe at the rear of the forepart.

10. That improvement in methods of making shoes which consists in molding the toe and heel ends of an upper off the last substantially to the shape desired for the finished shoe, fastening the molded toe and heel ends of the upper to an insole substantially as far along the sides of the shoe as the molding extends, thereafter stretching the upper lengthwise by engagement of a last with its molded toe and heel ends, pulling the longitudinally stretched upper over the forepart of the last at the rear of the molded toe at the opposite sides of the last simultaneously and fastening it to the insole, and thereafter lasting the sides of the shoe at the rear of the forepart.

11. That improvement in methods of making shoes which consists in fastening the toe and heel ends of an upper off the last to an insole while leaving the sides of the upper between the toe and heel end portions unfastened, inserting a last in the shoe, pulling the upper over the forepart of the last at the rear of its toe end portion at the opposite sides of the last simultaneously and fastening it to the insole, and thereafter lasting the sides of the shoe at the rear of the forepart.

12. That improvement in methods of making shoes which consists in molding the toe and heel ends of an upper off the last substantially to the shape desired for the finished shoe, fastening the molded toe and heel ends of the upper off the last to an insole, inserting a last in the shoe, gripping and pulling the upper simultaneously at its opposite sides in locations between the molded toe and the shank and fastening it to the insole in these locations, and thereafter lasting the sides of the shoe in the shank.

13. That improvement in methods of making shoes which consists in molding the toe and heel ends of an upper off the last substantially to the shape desired for the finished shoe, fastening the molded toe and heel ends of the upper to an insole, pulling the upper over the forepart of a last at the rear of the molded toe at the opposite sides of the last simultaneously while drawing the upper at one side forwardly toward the toe end of the last and fastening the upper in these locations to the insole, and thereafter lasting the sides of the shoe at the rear of the forepart.

14. That improvement in methods of making shoes which consists in molding the toe of an upper off the last substantially to the shape desired for the finished shoe and before the last is inserted fastening the molded toe permanently to an insole substantially as far rearwardly as the tip line, inserting a last in the shoe, pulling the upper over the forepart of the last at the rear of the molded toe and fastening it at the opposite sides to the insole, and thereafter lasting the sides of the shoe at the rear of the forepart.

15. That improvement in methods of making shoes which consists in shaping the toe and heels ends of an upper and fastening them permanently to an insole, pulling the upper over a last at the opposite sides of the forepart simultaneously at the rear of the previously shaped and fastened toe end portion and fastening the upper in these locations to the insole, and thereafter lasting the sides of the shoe at the rear of the forepart.

16. That improvement in methods of making shoes which consists in fastening an upper off the last to an insole, inserting in the shoe an expansible last and expanding the last to stretch the upper before the upper is laced, then contracting the last to relax the tension on the upper and lacing the upper, and thereafter expanding the last again and proceeding with the manufacture of the shoe.

17. That improvement in methods of making shoes which consists in molding the toe and heel ends of an upper off the last substantially to the shape desired for the finished shoe, fastening the molded toe and heel ends of the upper off the last to an insole, inserting in the shoe an expansible last and expanding the last before the upper is laced to stretch the upper lengthwise, then contracting the last and lacing the upper, and thereafter expanding the last again to stretch the upper further and then lasting the sides of the shoe.

18. That improvement in methods of making shoes which consists in inserting a hinged last in a shoe and straightening it to stretch the upper before it is laced, and thereafter breaking the last, lacing the upper, and straightening the last again.

19. That improvement in methods of making shoes which consists in molding the toe end of an upper off the last substantially to the shape desired for the finished shoe, mounting the upper on a last and stretching it lengthwise by engagement of the last with its toe and heel ends, pulling the upper over the forepart of the last at the rear of the molded toe at the opposite sides of the last simultaneously and fastening it, and thereafter lasting the sides of the shoe at the rear of the forepart.

20. That improvement in methods of making shoes which consists in stretching an upper lengthwise by a forward pull applied at its forepart while shaping its heel end portion to the contour required for the finished shoe, thereafter further stretching the upper by relative movement of the parts of a two-part last within the shoe, and after the stretching of the upper by the last lasting the sides of the shoe.

21. That improvement in methods of making shoes which consists in stretching an upper lengthwise by a forward pull applied at its forepart while shaping its heel end portion, off the last, over a form, fastening the heel end of the upper to an insole while continuing the forward pull on the upper, thereafter further stretching the upper by relative movement of the parts of a two-part last within the shoe, and after the stretching of the upper by the last lasting the sides of the shoe.

In testimony whereof we have signed our names to this specification.

JOSEPH GOULDBOURN.
FRED RICKS.